United States Patent
Seubert et al.

(10) Patent No.: US 10,560,983 B2
(45) Date of Patent: Feb. 11, 2020

(54) SELF-DEFROSTING SENSOR

(71) Applicant: Ford Global Technologies, LLC, Dearborn, MI (US)

(72) Inventors: Christopher Michael Seubert, New Hudson, MI (US); Kenneth Edward Nietering, Dearborn, MI (US); Mark Edward Nichols, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 395 days.

(21) Appl. No.: 15/416,410

(22) Filed: Jan. 26, 2017

(65) Prior Publication Data

US 2018/0208028 A1    Jul. 26, 2018

(51) Int. Cl.
*H05B 3/84* (2006.01)
*G01S 17/93* (2006.01)
*G01S 7/481* (2006.01)

(52) U.S. Cl.
CPC .............. *H05B 3/84* (2013.01); *G01S 7/4813* (2013.01); *G01S 17/936* (2013.01); *H05B 2214/02* (2013.01)

(58) Field of Classification Search
CPC .. H05B 2214/02; H05B 3/84; H05B 2214/00; H05B 3/00; H05B 3/0033; H05B 3/0038; H05B 3/0042; G01S 2007/4977; G01S 17/00; G01S 17/88; G01S 17/93; G01S 17/936; G01S 2007/4975; G01S 7/00; G01S 7/48; G01S 7/481; G01S 7/4811; G01S 7/4813; G01S 7/497; G01S 7/499; B60J 3/00; B60J 3/04

USPC .......................................................... 701/36
See application file for complete search history.

(56) References Cited

U.S. PATENT DOCUMENTS

| | | | |
|---|---|---|---|
| 5,654,736 A | 8/1997 | Green et al. | |
| 5,903,247 A | 5/1999 | Howard et al. | |
| 6,621,616 B1 | 9/2003 | Bauer et al. | |
| 7,166,819 B2 | 1/2007 | Winter et al. | |
| 8,760,750 B2 | 6/2014 | Powers et al. | |
| 2004/0047050 A1* | 3/2004 | Bauer | H01L 27/14618 359/738 |
| 2014/0175281 A1* | 6/2014 | Reynolds | B82Y 20/00 250/338.1 |
| 2014/0240690 A1* | 8/2014 | Newman | G01S 7/4808 356/4.01 |

(Continued)

FOREIGN PATENT DOCUMENTS

| | | |
|---|---|---|
| DE | 10246607 A1 | 4/2004 |
| DE | 102006003785 A1 | 7/2007 |

(Continued)

OTHER PUBLICATIONS

Search Report from United Kingdom Intellectual Property Office dated May 2, 2018 regarding Application No. GB1801117.1 (5 pages).

(Continued)

*Primary Examiner* — Charles J Han
(74) *Attorney, Agent, or Firm* — Frank A. MacKenzie; Bejin Bieneman PLC

(57) ABSTRACT

A computer is programmed to modify an electrical property to adjust an opacity of a sensor cover window. The computer is programmed to actuate an excitation source to emit electro-magnetic beams toward the cover window.

18 Claims, 5 Drawing Sheets

(56) References Cited

U.S. PATENT DOCUMENTS

2015/0346328 A1* 12/2015 Rondeau ............... G01S 7/4814
356/3
2015/0355326 A1 12/2015 Smith et al.

FOREIGN PATENT DOCUMENTS

| EP | 2589513 A1 | 5/2013 |
| JP | 200928414 A | 12/2009 |
| KR | 101144849 B1 | 5/2012 |
| WO | 2012163342 A1 | 12/2012 |

OTHER PUBLICATIONS

Search Report from United Kingdom Intellectual Property Office dated Sep. 4, 2018 regarding Application No. GB1801117.1 (2 pages).

* cited by examiner

SELF-DEFROSTING SENSOR

BACKGROUND

A vehicle may include one or more object detection sensors such as Light Detection and Ranging (LIDAR) sensors to detect objects, e.g., in an area outside the vehicle. A sensor for detecting objects outside a vehicle may be mounted to a vehicle exterior. For example, a sensor may be mounted to a vehicle roof, pillar, etc. A sensor such as a LIDAR sensor is typically subject to environmental conditions, e.g., heat, cold, humidity, etc., that can impair operation of the sensor.

DETAILED DESCRIPTION

Introduction

Figure 1:
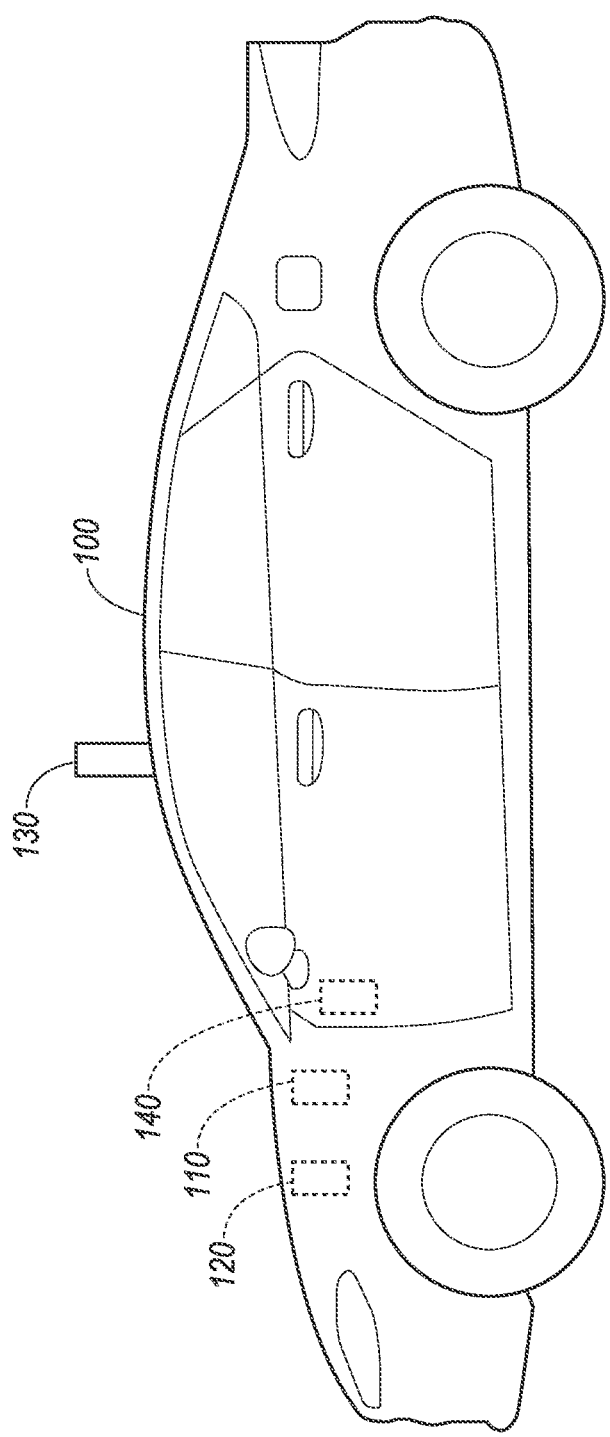
FIG. 1 is a diagram illustrating an example vehicle.
Figure 2A:
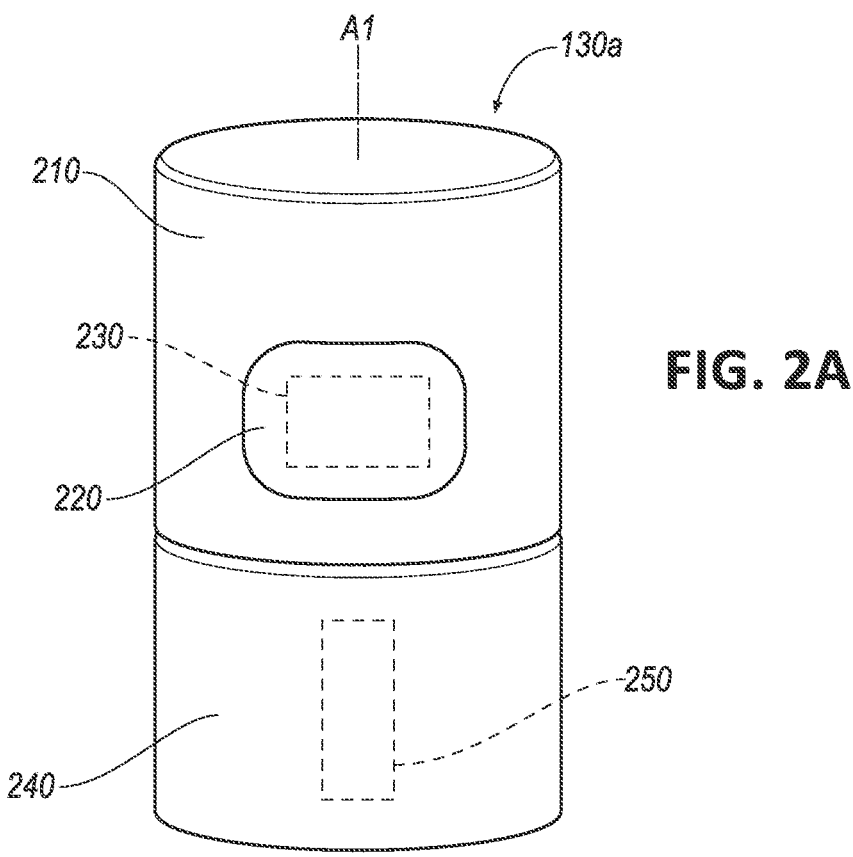
FIG. 2A is a diagram showing an example LIDAR sensor.
Figure 2B:
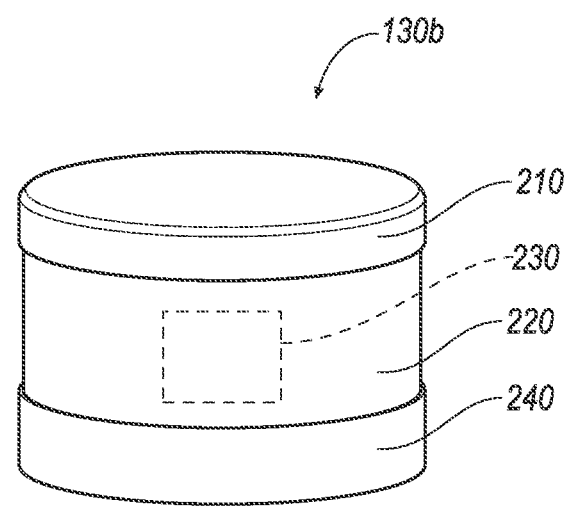
FIG. 2B is a diagram showing another example LIDAR sensor with rotational components.

Referring to FIGS. 1 and 2A-2B, a vehicle 100 computer 110 is programmed to modify an electrical property of a sensor 130 cover 210 window 220 to darken. For example, the sensor 130 may be a Light Detection and Ranging (LIDAR) sensor. The computer 110 is programmed to actuate an excitation source such as a LIDAR sensor 130 excitation source 230 to emit electro-magnetic beams to the cover 210 window 220, e.g., to defrost the window 220.

Exemplary System Elements

FIG. 1 illustrates a vehicle 100. The vehicle 100 may be powered in a variety of known ways, e.g., with an electric motor and/or internal combustion engine. The vehicle 100 may be a land vehicle such as a car, truck, etc. A vehicle 100 may include a computer 110, actuator(s) 120, sensor(s) 130, and a user interface 140.

The computer 110 includes a processor and a memory such as are known. The memory includes one or more forms of computer-readable media, and stores instructions executable by the computer 110 for performing various operations, including as disclosed herein.

The computer 110 may operate the vehicle 100 in an autonomous mode, a semi-autonomous mode, or a non-autonomous mode. For purposes of this disclosure, an autonomous mode is defined as one in which each of vehicle 100 propulsion, braking, and steering are controlled by the computer 110; in a semi-autonomous mode the computer 110 controls one or two of vehicles 100 propulsion, braking, and steering; in a non-autonomous mode, an operator controls the vehicle 100 propulsion, braking, and steering.

The computer 110 may include programming to operate one or more of land vehicle brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may include or be communicatively coupled to, e.g., via a vehicle 100 communications bus as described further below, more than one processor, e.g., controllers or the like included in the vehicle for monitoring and/or controlling various vehicle controllers, e.g., a powertrain controller, a brake controller, a steering controller, etc. The computer 110 is generally arranged for communications on a vehicle communication network that can include a bus in the vehicle such as a controller area network (CAN) or the like, and/or other wired and/or wireless mechanisms.

Via the vehicle 100 network, the computer 110 may transmit messages to various devices in the vehicle and/or receive messages from the various devices, e.g., an actuator 120, a user interface 140, etc. Alternatively or additionally, in cases where the computer 110 actually comprises multiple devices, the vehicle 100 communication network may be used for communications between devices represented as the computer 110 in this disclosure. As discussed further below, various electronic controllers and/or sensors 130 may provide data to the computer 110 via the vehicle communication network.

The vehicle 100 actuators 120 are implemented via circuits, chips, or other electronic and/or mechanical components that can actuate various vehicle subsystems in accordance with appropriate control signals, as is known. The actuators 120 may be used to control vehicle 100 systems such as braking, acceleration, and/or steering of the vehicles 100.

Vehicle 100 sensors 130 may include a variety of devices known to provide data via the vehicle communications bus. For example, the sensors 130 may include one or more camera, radar, infrared, and/or LIDAR sensors 130 disposed in the vehicle 100 and/or on the vehicle 100 providing data encompassing at least some of the vehicle 100 exterior. The data may be received by the computer 110 through a suitable interface such as is known. A LIDAR sensor 130 disposed, e.g., on a top of the vehicle 100, may provide object data including relative locations, sizes, and shapes of objects such as other vehicles surrounding the vehicle 100. A vehicle 100 computer 110 may receive the object data and operate the vehicle in an autonomous and/or semi-autonomous mode based at least in part on the received object data.

The user interface device(s) 140 may be configured to receive user input, e.g., during operation of the vehicle 100. For example, a user may select a mode of operation, e.g., an autonomous mode, by inputting a requested mode of operation via a user interface device 140. Moreover, a user interface device 140 may be configured to present information to the user. Thus, a user interface device 140 may be located in a passenger compartment of the vehicle 100. In an example, the computer 110 may output information indicating that a vehicle 100 mode of operation such as an autonomous mode is deactivated due to an event, e.g., a LIDAR sensor 130 sensor blockage that impairs its object detection operation.

FIGS. 2A-2B show example LIDAR sensor 130 sensors each including a body 240, an excitation source 230, and a cover 210 having a window 220. The excitation source 230 may transmit an electro-magnetic beam such as a laser beam through the window 220 to an area surrounding the LIDAR sensor 130. The LIDAR sensor 130 may include a receiver that receives reflections of the transmitted electro-magnetic beams. The cover 210 may be formed of plastic, metal, etc. The cover 210 may protect the excitation source and/or other electronic components from environmental influences such as rain, wind, etc. The window 220 may have a flat, round, etc. shape. The windows 220 may be formed of glass, plastic, etc. The windows 220 may include a lens, e.g., to focus electro-magnetic beams.

As shown in FIG. 2A, a rotational LIDAR sensor 130a may include an actuator 250, e.g., an electric motor, to move, e.g., rotate, the excitation source 230 relative to the body 240. In an example, the actuator 250 may rotate the excitation source 230 about an axis A1 perpendicular to the body 240, and may provide a 360-degree horizontal field of view of an area around the LIDAR sensor 130. In one example, the excitation source 230, the cover 210, and the window 220 may rotate about the axis A1. In another example, the cover 210 including the window 220 may be fixed to the body 240, e.g., the excitation source 230 rotates relative to the body 240 and the cover 210. As shown in FIG. 2B, an example non-rotational LIDAR sensor 130b may lack an actuator 250, i.e., the cover 210, the window 220, and the excitation source 230 may be fixed relative to the body 240.

In order to provide data, a window 220 of a LIDAR sensor 130 may allow the transmitted electro-magnetic beams and received reflections of the transmitted radiations to pass through the window 220. Various conditions may cause a window 220 blockage, e.g., attenuating (weakening) the transmitted radiations and/or reflections thereof when passing through the window 220. For example, an object detection operation of a LIDAR sensor 130 may be impaired upon a blockage of the LIDAR sensor 130 window 220. In one example, air moisture may build up a frost layer on an exterior surface of the LIDAR sensor 130 window 220 and cause a frost blockage of the LIDAR sensor 130, e.g., when an outside air temperature is below 5 degrees Celsius. For example, the computer 110 may be programmed to activate a non-autonomous mode of the vehicle 100 upon determining that a LIDAR sensor 130 cannot provide object data, e.g., due to a frost blockage of the LIDAR sensor 130.

Heating a LIDAR sensor 130 window 220 may defrost the window 220 and/or may prevent a frost build-up. In one example, the vehicle 100 computer 110 is programmed to modify an electrical property of a LIDAR sensor 130 cover 210 window 220 to darken. The computer 110 may then actuate a LIDAR sensor 130 excitation source 230 to emit electro-magnetic beams to the cover 210 including the window 220. The darkened window 220 may absorb energy from the emitted electro-magnetic beams. Thus, the absorbed energy may generate heat in the window 220 and defrost the window 220, and/or may prevent building up frost. Additionally, the computer 110 may be programmed to actuate the excitation source 230 to increase an intensity of the emitted electro-magnetic beams to, e.g., speed up a defrost of the window 220. An intensity of the emitted electro-magnetic beams in the context of the present disclosure means a measure of power emitted by the electro-magnetic beams.

Figure 3A:
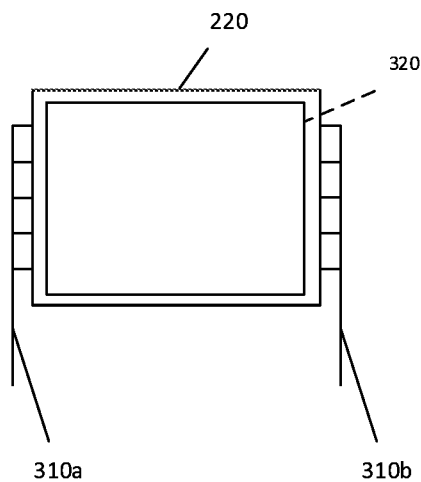
FIG. 3A is a diagram showing an exemplary window of a LIDAR sensor including a material with a changeable opacity.
Figure 3B:
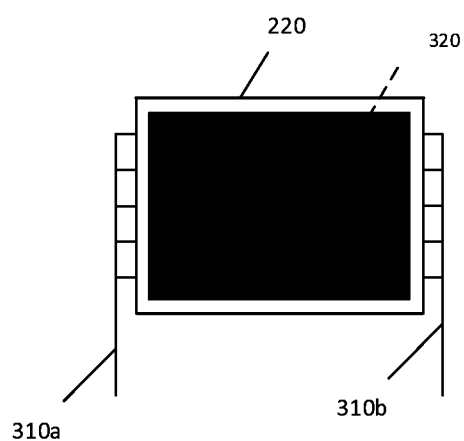
FIG. 3B is a diagram showing the window of FIG. 3A in a darkened state.

Various techniques may be used to make a window 220 with an electrical property that provides an opacity which can be controlled via a computer 110. In one example, as shown in FIGS. 3A-3B, the window 220 may include a material with an electrical property to influence an opacity of the window 220. Opacity is a measure of the degree to which electromagnetic radiation such as the radiation emitted by the sensor 130 penetrates the window 220. For example, an opaque window 220 with a high opacity attenuates the emitted energy more than a transparent window 220 with a low opacity. For example, for a given medium, e.g., the material included in the window 220, and a given frequency, e.g., a frequency of the radiation transmitted by the excitation source 230, an opacity may have a numerical quantity between 0% (zero) and 100%. Zero percent opacity may be associated with a transparent material, whereas 100% opacity may be associated with an opaque material completely preventing a radiation with the given frequency from passing through the given medium. An electrical property in the present context includes a change of opacity based on an electrical input, e.g., an amount of an electric current, a voltage, and/or a frequency, etc. In other words, an opacity of a material with the electrical property may change in accordance to a current, a voltage, etc. applied to the material. In one example, an opacity state of a window 220 may be changed between an opaque state and a transparent state. Additionally or alternatively, an opacity of a window 220 may be changed between multiple levels based on an electrical input.

For example, as shown in FIGS. 3A-3B, the window 220 may include an area 320 incorporating an electrochromic material, e.g., tungsten oxide, as a material having an electrical property as described above, i.e., a dependence of opacity on an electric input. For example, the area 320 may include a polymer-based film including an electrochromic material that is attached, e.g., laminated, to the window 220. Additionally or alternatively, the area 320 may include materials produced using Suspended Particle Device (SPD) technology, such as is known, that can be switched from clear to darkened states. Additionally or alternatively, the area 320 may include a material produced based on known Polymer Dispersed Liquid Crystal (PDLC) technology. In an absence of an electric field, crystals (particles) of SPD and/or PDLC material incorporated in a window 220 are randomly oriented and may absorb the emitted electro-magnetic radiation, i.e., the window 220 has a high opacity. In a presence of an electric field, the crystals orient with the field and pass the electro-magnetic radiation, i.e., the window 220 has a relatively lower opacity.

As shown in FIGS. 3A-3B, the window 220 may include electrodes 310a, 310b for actuating the area 320, e.g., by applying an electric voltage between the electrodes 310a, 310b, e.g., via an electric circuit. For example, when the window 220 area 320 includes SPD and/or PDLC-based material, the computer 110 may output a voltage, e.g., 0 (zero) Volt, between the electrodes 310a, 310b to darken, i.e., increase opacity of, the window 220 to a high opacity, e.g., 90% (see FIG. 3B). The computer 110 may be programmed to output a different voltage, e.g., 100 Volt AC (Alternating Current) for SPD-based material, 50 Volt AC for PDLC-based material, etc., between the electrodes 310a, 310b to reduce the opacity of the window 220 (see FIG. 3A). In another example, when the window 220 area 320 includes electrochromic material, the computer 110 may be programmed to output a first voltage, e.g., 3 Volt DC (Direct Current), to reduce the opacity of the window 220 (see FIG. 3A). Further, the computer 110 may be programmed to output a voltage at a reverse polarity with respect to the first voltage, e.g., −3 Volt DC, to darken, i.e., increase opacity of, the window 220 to a high opacity, e.g., 90% (see FIG. 3B).

The computer 110 may be programmed to actuate the excitation source 230 to emit an electro-magnetic beam, e.g., an infrared beam, to the cover 210. Such operation of the LIDAR sensor 130, i.e., darkened window 220 and emitting electro-magnetic beams to the window 220 to generate heat, may be referred to as "defrost mode." On the other hand, in an "object detection mode", the computer 110 may actuate the window 220 to become transparent, i.e., to have a low opacity, e.g., 5%, and emit electro-magnetic radiations to detect objects.

Figure 4A:
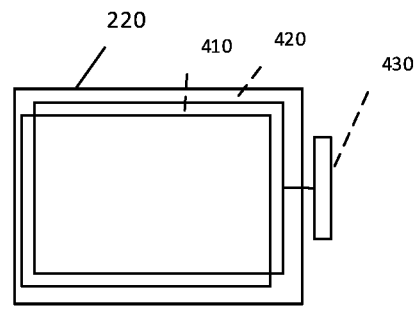
FIG. 4A is a diagram showing another exemplary window of a LIDAR sensor including a movable polarizing film.
Figure 4B:
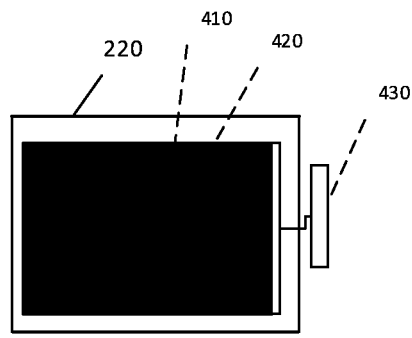
FIG. 4B is a diagram showing the window of FIG. 4A in a darkened state.

In another example, as shown in FIGS. 4A-4B, an opacity of the window 220 may be modified by moving polarizing films with respect to one another. For example, the LIDAR sensor 130 window 220 may include a first polarizing film 410, e.g., attached to the window 220, and a second polarizing film 420 that is moveable relative to the first polarizing film 410. In one example, the LIDAR sensor 130 may include an electromechanical actuator 430, e.g., a solenoid, mechanically coupled to the second polarizing film 420. In a first position of the second polarizing film 420 relative to the first polarizing film 410, the window 220 may have a low opacity (see FIG. 4A). In a defrost mode, the computer 110 may be programmed to move the second polarizing film 420 (rotationally and/or linearly) relative to the first polarizing film 410 to a second position that causes to darken the window 220 (see FIG. 4B). In one example, the polarizing films 410, 420 may include wave plates (or retarders), e.g., formed of birefringent material such as quartz, etc. For example, the polarizing films 410, 420 with the wave plate may move linearly relative to one another to darken the window 220, e.g., by a linear translation of the polarity of the beams. Additionally or alternatively, an opacity of a window 220 polarizing film 410 may be changeable based on a polarity of the emitted electro-magnetic beams. Thus, the computer 110 may be programmed to change a polarity of the electro-magnetic beams emitted from the excitation source 230 to change an opacity of the window 220. For example, the computer 110 may be programmed to cause an emission of electro-magnetic beams with a first polarity, to which the window 220 polarizing film 410 reacts with a low opacity, when the sensor 130 is operated in the object detection mode. The computer 110 may be programmed to cause an emission of electromagnetic beams with a second polarity, to which the window 220 polarizing film 410 reacts with a higher opacity, e.g., 80%, when the sensor 130 operates in the defrost mode.

With reference to FIGS. 3A-3B and 4A-4B, in a defrost mode, due to darkening of the window 220, the computer 110 may not receive object detection data from the LIDAR sensor 130. In one example, the computer 110 may be programmed to deactivate an autonomous mode of the vehicle 100 when the LIDAR sensor 130 window 220 is in the defrost mode. In one example, the vehicle 100 may be operated by a user only in the non-autonomous mode when the LIDAR sensor 130 window 220 is in the defrost mode. In another example, the computer 110 may be programmed to activate the defrost mode of the LIDAR sensor 130 upon determining that the vehicle 100 is in a non-moving state, e.g., parked, and/or an exterior temperature is below a predetermined threshold, e.g., 5 degrees Celsius. In another example, the computer 110 may be programmed to actuate the excitation source to emit electro-magnetic beams in the defrost mode that have a different wavelength spectrum compared to the beams emitted when the LIDAR sensor 130 is in the object detection mode. For example, in the object detection mode, the computer 110 may actuate the excitation source 230 to emit beams with a wavelength of 905 nanometer (nm). On the other hand, in the defrost mode, the computer 110 may actuate the excitation source 230 to emit beams with a wavelength of 700 nm.

Processing

Figure 5:
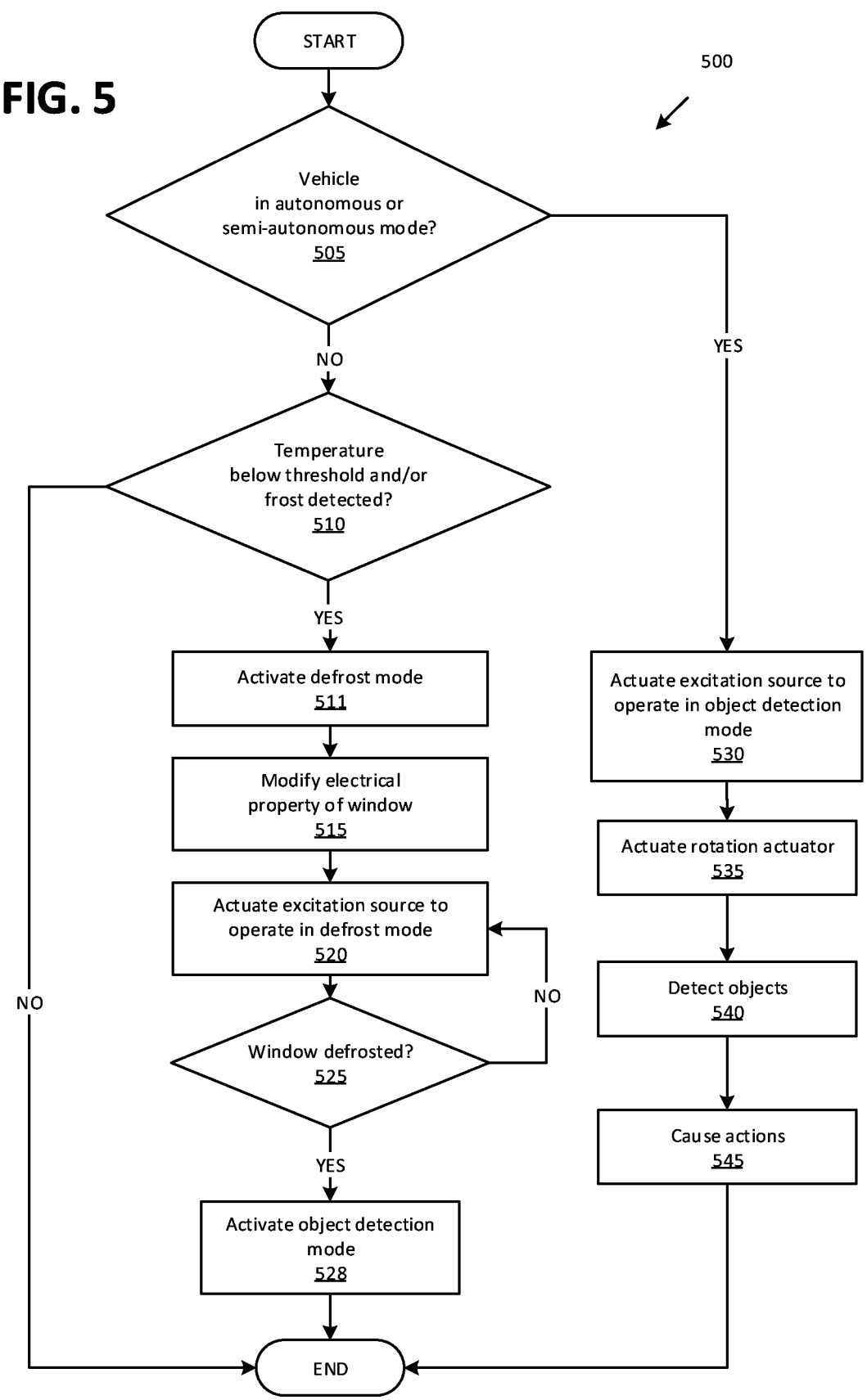
FIG. 5 is a flowchart of an exemplary process for operating a LIDAR sensor.

FIG. 5 is a flowchart of an example process 500 for defrosting a LIDAR sensor 130 window 220. In one example, the vehicle 100 computer 110 can be programmed to execute and/or to instruct actuators to execute blocks of the process 500.

The process 500 begins at a decision block 505, in which the computer 110 determines whether the vehicle 100 is operating in one of an autonomous mode and a semi-autonomous mode, or is operating in a non-autonomous mode. Additionally or alternatively, the computer 110 may inhibit an operation of the vehicle 100 in an autonomous mode and/or semi-autonomous mode upon determining that the LIDAR sensor 130 has built-up frost, e.g., based on received reflections by a LIDAR sensor 130 electro-magnetic receiver. For example, the computer 110 may activate a vehicle 100 non-autonomous mode upon determining that an operation of the LIDAR sensor 130 is impaired, e.g., because of frost. If the computer 110 determines that the vehicle 100 is in one of the autonomous and semi-autonomous modes, then the process 500 proceeds to a block 530; otherwise the vehicle 100 is determined to be in a non-autonomous mode, and the process 500 proceeds to a decision block 510.

In the decision block 510, the computer 110 determines whether an outside temperature is below a predetermined threshold, e.g., 5 degrees Celsius, and/or determines that a frost on the LIDAR sensor 130 window 220 is detected. In one example, the computer 110 may receive temperature data from an outside temperature sensor mounted to, e.g., a vehicle 100 bumper. Additionally or alternatively, the computer 110 may be programmed to determine whether a frost has built-up on the window 220, e.g., based on received reflections. If the computer 110 determines that the outside temperature is below the predetermined threshold and/or determines that a frost on the LIDAR sensor 130 window 220 is detected, then the process 500 proceeds to a block 511; otherwise the process 500 ends, or alternatively returns to the decision block 505 (although this alternative is not shown in FIG. 5).

In the block 511, the computer 110 activates the defrost mode of the LIDAR sensor 130. In one example, the computer 110 prevents activation of a vehicle 100 autonomous mode and/or a vehicle 100 semi-autonomous mode upon determining that the LIDAR sensor 130 operates in the defrost mode.

Next, in a block 515, the computer 110 modifies an electric property of the window 220 of the vehicle 100 LIDAR sensor 130 to darken, i.e., increases an opacity of, the window 220. For example, the computer 110 can actuate increasing opacity of an area 320 by causing actuation of the electrodes 310a, 310b (see FIGS. 3A-3B), actuating an actuator 430 to move a second polarizing film 420 relative to a first polarizing film 410 (see FIGS. 4A-4B), etc.

Next, in a block 520, the computer 110 actuates the excitation source 230 to operate in a defrost mode, e.g., by emitting electro-magnetic beams such as infrared beams directed toward the cover 210 window 220. Thus, advantageously, the LIDAR sensor 130 may be defrosted and/or frosting of the LIDAR sensor 130 may be prevented. Additionally, the computer 110 may be programmed to actuate the excitation source to increase an intensity of electromagnetic beams emitted from the excitation source to, e.g., a maximum available intensity level of the excitation source 230. Upon defrosting a LIDAR sensor 130, the LIDAR sensor 130 may be placed in an object detection mode, and may become operable to detect objects where frost would otherwise prevent such operation, and further, for example, the vehicle 100 may operate in an autonomous mode, which otherwise may be unavailable due to a frost blockage on a LIDAR sensor 130 window 220.

Next, in a decision block 525, the computer 110 determines whether the window 220 is defrosted. As one example, the computer 110 may be programmed to temporarily reduce an opacity of the window 220, e.g., by reducing opacity of an area 320 by actuating electrodes 310a, 310b. The computer 110 may then determine, based on received reflections of beams emitted from the excitation source 230, whether the window 220 is defrosted. After determining whether the window 220 is defrosted, the computer 110 may increase opacity of the area 320, e.g., by causing actuation of the electrodes 310a, 310b (i.e., resuming an opacity used during defrost mode). If the computer 110 determines that the window 220 is defrosted, then the process 500 proceeds to a block 528; otherwise the process 500 returns to the block 520.

In the block 528, the computer 110 activates the object detection mode of the LIDAR sensor 130. For example, the computer 110 may be programmed to actuate the window 220, e.g., via the electrodes 310a, 310b, to reduce an opacity of the window 220.

In the block 530, the computer 110 actuates the excitation source 230 to operate in an object detection mode. For example, the computer 110 actuates the excitation source to emit laser beams, receive the reflections of the emitted laser beams via an electro-magnetic receiver, and detect objects based at least in part on the received reflections.

Next, in a block 535, when the vehicle 100 includes a rotational LIDAR sensor 130, the computer 110 may actuate an actuator 250 to rotate the excitation source 230 relative to the body 240. For non-rotational sensors 130b, the block 535 will be omitted.

Next, in a block 540, the computer 110 may detect one or more objects in an area within a field of view of the LIDAR sensor 130. For example, the computer 110 may receive data including relative locations, sizes, and shapes of objects such as other vehicles surrounding the vehicle 100.

Next, in a block 545, the computer 110 causes an action based at least in part on the detected objects. For example, the computer 110 may actuate a vehicle 100 brake actuator 120 to decelerate the vehicle 100 based on the detected object data, e.g., when a distance between the vehicle 100 and a detected object on a vehicle 100 path is less than a predetermined distance threshold.

Following either of the block 528 or 545, the process 500 ends, or alternatively returns to the decision block 505.

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH, an EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A system, comprising a computer, the computer including a processor and a memory, the memory storing instructions executable by the processor such that the computer is programmed to:
   modify an electrical property of a sensor cover window of a sensor and thereby adjust an opacity of the sensor cover window upon determining that a vehicle including the sensor is at least one of operating in a non-autonomous mode and in a non-moving state; and
   actuate an excitation source that emits electro-magnetic beams toward the sensor cover window to operate in a defrost mode.

2. The system of claim 1, wherein the computer is further programmed to modify the electrical property of the sensor cover window upon determining that a vehicle exterior temperature is below a temperature threshold.

3. The system of claim 1, wherein the computer is further programmed to receive data from received reflections of the emitted electro-magnetic beams and to detect one or more objects based on the received data.

4. The system of claim 1, wherein the computer is further programmed to modify the electrical property of the sensor cover window by outputting an electrical voltage to one of more electrodes mounted to the cover window.

5. The system of claim 1, wherein the computer is further programmed to modify the electrical property of the sensor cover window by outputting an electric voltage to a conductive material incorporated in the cover window.

6. The system of claim 1, further comprising the sensor, wherein the sensor is a LIDAR sensor, wherein the LIDAR sensor includes the cover window.

7. A system, comprising:
   a LIDAR sensor including a cover having a window and an electromagnetic beam emitter, wherein the electromagnetic beam emitter is arranged to emit electromagnetic beams toward the window and apply voltage to the window and thereby vary the opacity of the window; and
   a computer programmed to actuate the electromagnetic beam emitter and thereby increase the opacity of the window upon determining that a vehicle including the LIDAR sensor is at least one of operating in a non-autonomous mode and in a non-moving state, and then actuate the electromagnetic beam emitter in a defrost mode.

8. The system of claim 7, further comprising a vehicle body having a roof, wherein the LIDAR sensor is mounted to the roof.

9. The system of claim 7, wherein the window includes a transparent state and an opaque state.

10. The system of claim 7, wherein the window includes a lens.

11. The system of claim 7, wherein the window is formed of at least one of glass and plastic.

12. The system of claim 7, wherein the cover is formed of at least one of plastic and metal.

13. The system of claim 7, wherein the LIDAR sensor further includes a sensor body and the cover is rotatable relative to the sensor body.

14. The system of claim 7, wherein the LIDAR sensor is mountable to a vehicle.

15. The system of claim 7, further comprising electrodes arranged to supply the voltage to the window.

16. A method, comprising:
   modifying an electrical property of a cover window of a LIDAR sensor and thereby adjusting an opacity of the LIDAR sensor cover window upon determining that a vehicle including the LIAR sensor is at least one of operating in a non-autonomous mode and in a non-moving state; and
   actuating a LIDAR excitation source that emits electromagnetic beams to the LIDAR sensor cover window to operate in a defrost mode.

17. The method of claim 16, further comprising modifying the electrical property of the cover window only if a vehicle exterior temperature is below a temperature threshold.

18. The method of claim 16, further comprising modifying the electrical property of the cover window further by outputting an electric voltage to a material incorporated in the cover window.

* * * * *

UNITED STATES PATENT AND TRADEMARK OFFICE
CERTIFICATE OF CORRECTION

| | | |
|---|---|---|
| PATENT NO. | : 10,560,983 B2 | Page 1 of 1 |
| APPLICATION NO. | : 15/416410 | |
| DATED | : February 11, 2020 | |
| INVENTOR(S) | : Christopher Michael Seubert et al. | |

It is certified that error appears in the above-identified patent and that said Letters Patent is hereby corrected as shown below:

In the Claims

Column 10, Line 17, replace "LIAR" with --LIDAR--.

Signed and Sealed this
Twenty-fourth Day of March, 2020

Andrei Iancu
*Director of the United States Patent and Trademark Office*